US006525732B1

United States Patent
Gadh et al.

(10) Patent No.: US 6,525,732 B1
(45) Date of Patent: Feb. 25, 2003

(54) NETWORK-BASED VIEWING OF IMAGES OF THREE-DIMENSIONAL OBJECTS

(75) Inventors: Rajit Gadh, Madison, WI (US);
Xiaochun Liu, Madison, WI (US);
Chi-Cheng P. Chu, Madison, WI (US);
Jianchang Qi, Madison, WI (US)

(73) Assignee: Wisconsin Alumni Research Foundation, Madison, MI (US)

( * ) Notice: Subject to any disclaimer, the term of this patent is extended or adjusted under 35 U.S.C. 154(b) by 0 days.

(21) Appl. No.: 09/506,353

(22) Filed: Feb. 17, 2000

(51) Int. Cl.⁷ ............................................... G06T 17/00
(52) U.S. Cl. ...................................................... 345/428
(58) Field of Search ................................ 345/419–420, 345/423, 427, 428, 581, 587; 348/144

(56) References Cited

U.S. PATENT DOCUMENTS 6,100,897 A * 8/2000 Mayer et al. ................ 345/428
6,271,877 B1 * 8/2001 LeCompte .................. 348/144

* cited by examiner

*Primary Examiner*—Almis R. Jankus
(74) *Attorney, Agent, or Firm*—Craig A. Fieschko, Esq.; DeWitt Ross & Stevens S.C.

(57) ABSTRACT

A three-dimensional object may be imaged from several viewpoints distributed about the object, and the image obtained at each viewpoint may be stored in conjunction with the viewpoint's coordinates about the object. The object's image can then be transmitted for display over a client-server computer network, and the user may issue commands to manipulate the object, so as to very accurately simulate manipulation of the actual three-dimensional object. The client computer may display the object's image from one of the viewpoints. If the user then wishes to manipulate the object, the user will issue a command to the server to index from the coordinates of the first viewpoint to the coordinates of some adjacent viewpoint(s). The images of the adjacent viewpoints will then be displayed in a sequence corresponding to the order in which the coordinates of the viewpoints are indexed. Zooming (enlargement and reduction of views) and other features are also discussed, as well as various procedures for enhancing transmission time (and thus display speed).

20 Claims, 1 Drawing Sheet

NETWORK-BASED VIEWING OF IMAGES OF THREE-DIMENSIONAL OBJECTS

STATEMENT REGARDING FEDERALLY SPONSORED RESEARCH

This invention was made with United States government support awarded by the following agencies:
NSF Grant No: [MUST BE INSERTED ONCE DETERMINED] The United States may have certain rights in this invention.

FIELD OF THE INVENTION

This invention relates generally to the field of computer graphics and animation, and more specifically to the field of computerized virtual reality environments and the display, manipulation, and navigation of three-dimensional objects (in both two-dimensional and three-dimensional formats).

BACKGROUND OF THE INVENTION

It is often desirable to be able to display and navigate a lifelike three-dimensional representation of an object or scene in a computerized environment. However, known applications directed to this purpose tend to suffer from several shortcomings. Initially, they tend to utilize computer-generated 3D models of objects which are then rendered on a computer monitor (or other output device) in 2D form. While the rendered models should theoretically closely resemble their real-world counterparts, they generally do not look very realistic. Realism may be enhanced by increasing their level of detail, but this results in increased processing burden and slower rendering speed. Speed is particularly problematic where viewing and navigation is to be provided in a networked environment, e.g., over the Internet/World Wide Web, largely owing to the size of the image data to be transmitted. There is great interest in the ability to allow users to view, manipulate, and navigate realistic three-dimensional objects in virtual environments over the Internet, since this would enhance personal communications, provide greater possibilities for entertainment, and allow consumers to closely inspect goods prior to engaging in e-commerce transactions. However, prior efforts to allow display, manipulation, and navigation of three-dimensional objects have largely been thwarted by the limited bandwidth available to most users.

SUMMARY OF THE INVENTION

The current invention provides methods and apparats for review of images of three-dimensional objects in a system of networked computers, and navigation through the computerized virtual environment of the objects (i.e., in the environment in which they are displayed). The invention may be implemented in any form that is encompassed by the claims set forth at the end of this document. So that the reader may better understand the invention and some of the various forms in which it may be provided, following is a brief summary of particularly preferred versions of the invention.

A three-dimensional object may be imaged (e.g., by a digital camera) from several viewpoints distributed about the object, and the image obtained at each viewpoint may be stored in conjunction with the viewpoint's coordinates about the object. Preferably, the viewpoints are densely and evenly distributed about the object; for example, the images might be obtained from viewpoints evenly spread about the surface of a virtual sphere surrounding the object, with each viewpoint being situated no more than 30 degrees from an adjacent viewpoint (with lesser angular separation being more desirable).

The object's image can then be transmitted for display by a client computer over a client-server network, and the user may issue commands to manipulate the object so as to accurately simulate manipulation of the actual three-dimensional object. The client computer may display the object's image from one of the viewpoints. If the user then wishes to manipulate the object, the user will issue a command to the server to index from the coordinates of the first viewpoint to the coordinates of some adjacent viewpoint(s). The images of the adjacent viewpoints will then be displayed in a sequence corresponding to the order in which the coordinates of the viewpoints are indexed. As an example, the user may "rotate" the virtual object by indexing about the coordinates of viewpoints encircling the object, and images of the viewpoints at these coordinates will be displayed to the user in succession. To the user, this may appear as an animated view of the rotating three-dimensional object, or of a rotating three-dimensional model of the object, even though the display is rendered solely from two-dimensional images.

This arrangement is advantageously implemented in either multi-user or single-user settings. In a multi-user setting, the images are preferably stored locally on the client computer, and the network is used to transmit data other than images (e.g., each user's current viewpoint coordinates, indexing commands). Thus, each user may manipulate and navigate the object on his/her computer, but can obtain the viewpoint coordinates at other client computers so as to obtain the same view as another user. Alternatively, the user may obtain the indexing commands being issued by users at other client computers so as to allow these commands to apply to the user's own display.

In a single-user setting, the images are initially stored entirely by the server. Prior to navigation, the client obtains the image of the first viewpoint from the server, and preferably also the images from some set of "neighboring" adjacent viewpoints prior to allowing navigation. This allows the user to immediately index between the images of these adjacent viewpoints when navigation begins, as opposed to requiring that the user wait to index between viewpoints. As an example, prior to allowing navigation, the client might obtain the images of a set of viewpoints which encircles the object; once these images are loaded, the user will be able to view images corresponding to a full orbit about the object without having to pause while further images are transmitted from the server.

The invention also preferably incorporates features which allow users to zoom images in and out (i.e., to enlarge or reduce the scale of images) without significant loss of resolution or unduly long delays in image transmission. When the object is initially imaged from the various viewpoints, these images are advantageously obtained at high resolution. As a result, the images can readily be scaled down to a lower resolution level using known scaling algorithms. In the single-user mode noted earlier, the images can then initially be transmitted to the client at some default resolution level which is preferably low, since such images are more rapidly transmitted than high-resolution images. When the user then issues a command to zoom in on the image, scaling algorithms can be used at the client to enlarge the image until some threshold level of coarseness is reached (i.e., until the image appears too "grainy"). If the user then continues to issue zoom commands, the client can obtain a higher-resolution image from the server to compensate for the decreasing level of resolution. The higher-resolution image can then be subjected to scaling algorithms if the user enters further zoom commands, and images of still higher resolution can be obtained from the server if other coarseness thresholds are passed. The reverse process can be followed if the user issues commands to zoom out of the image, but this process may be faster if previously loaded (and currently cached) images are used. Since higher-resolution (and slower-transmission) images are only transmitted to the client when needed to maintain a desired level of resolution, transmission speed is enhanced.

The zoom process can be further enhanced if the concept of tiling is introduced. Images are divided into sets of arrayed sections or "tiles" of identical size, as by placing a uniform grid over each image; as an example, an image might be divided into four tiles by bisecting it both horizontally and vertically. If the user zooms in on an area of the image which consists of less than all of the tiles—for example, an area in one quadrant (one tile) of the image, or in one half (two adjacent tiles) of the image—the server will transmit to the client only the higher-resolution versions of these particular tiles once the coarseness threshold is reached. In other words, the server will transmit only so many tiles as are necessary to render the portion of the image being zoomed.

It is preferable to also implement certain procedures when users wish to index from a first viewpoint to another viewpoint, and wherein the image of the first viewpoint is already being displayed at higher than the default resolution (i.e., where a user first zooms in on a viewpoint to obtain an enlarged view, and then wishes to index to adjacent viewpoints at the same level of enlargement). If indexing from one zoomed-in view to adjacent zoomed-in views is done by having the server transmit higher-resolution zoomed-in images (or tiles) at every indexing step, the time required for indexing may be significant. To reduce the indexing time, it is preferred that when the user issues commands to index from a first zoomed-in viewpoint to adjacent viewpoints, the images of the adjacent viewpoints are initially displayed at the default (lower) resolution level. As previously noted, these images may already be loaded in the client's memory as "neighborhood" images (thus requiring no transmission from the server); if they are not already present at the client, they still have lesser transmission time between the server and client because they are at lower resolution. When the user ceases issuing indexing commands for long enough that the image of the current viewpoint can be transmitted to the client at high resolution, the current viewpoint will then display the high-resolution image. Thus, when a user indexes from one zoomed-in viewpoint to adjacent viewpoints, the image of the first viewpoint will be displayed at high resolution and the images of intermediate viewpoints will be displayed at the (lower) default resolution. The image of the final viewpoint will first be displayed at the lower default resolution, but will then be displayed at high resolution once the high resolution image has sufficient time to load (i.e., if it can load before another indexing command is issued by the user).

Additionally, the framework of the invention is well-adapted for the incorporation of optional (but advantageous) features such as automated registration of the object's images about a common center in the virtual sphere (i.e., centering of the object within all of its images), to prevent aberrations when the object is rotated or otherwise manipulated; automatic cleaning of the background of the images to isolate the object in the images; and reconstruction of a 3D model of the object by using its multiple 2D images. These features will be discussed at greater length later in this document.

DETAILED DESCRIPTION OF PREFERRED VERSIONS OF THE INVENTION

Initially, it should be understood that where this document discusses viewing or acting upon the "object," the described action is generally being taken with regard to the object's image rather than with regard to the actual object itself. More accurately, the action is generally being taken with regard to the sphere (or other volume) about which the object's images are obtained. In the following discussion, whether the word "object" refers to the actual object, the object's image, or the sphere (or other bounding volume) should be clear from the context of the discussion. Additionally, it is noted that the word "object" may be used as a shorthand expression for multiple objects which coexist in the same virtual environment, as well as for a single object.

The function and operation of preferred versions of the invention may be described as follows.

Section I. Obtain Images Distributed About the Object's Volume:

The object of interest is digitally imaged from different angles and locations to obtain images of the object from a variety of viewpoints distributed about the object. The images may be obtained by use of a digital camera, by digital imaging of photographs of the object, or other methods.

Section I.A. Distribution of Images About the Object

Preferably, the images are distributed about the object as described in one of the following Sections. It is noted that these Sections will describe imaging the object at points distributed about the surface of a virtual bounding sphere wherein the object is situated; however, it is noted that bounding volumes other than spheres may be used, with a sphere being the most preferable volume.

Figure 1:
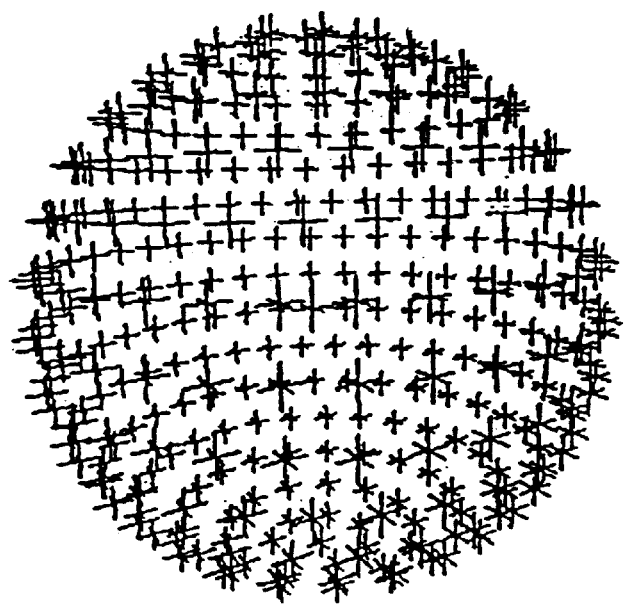
FIG. 1 is a perspective view of a potential image distribution scheme wherein an object centered within the virtual sphere is imaged from each of the illustrated viewpoints about the sphere.

Section IA.1 Distribution of Images About the Object: Equal Arc Length/Angle Approach (FIG. 1)

Assume the object has a bounding sphere denoted R. Envision a virtual sphere S, which shares its center with R except that S has a larger radius. Define points on the surface of S wherein equal arc length exists between the points, or wherein equal angles exist between lines from the center of S to the points (as shown in FIG. 1). The resulting number of points on S is preferably between 121 and 384. The object is then imaged from each of these points (which may be thought of as "viewpoints"), and the images are saved and indexed versus their viewpoint coordinates on the sphere. Conceptually, one can envision the result as if the sphere was provided with a faceted surface, the facets being uniform polygons, wherein an image of the object is provided on each facet (with the imaging occurring along an axis directed from the center of the polygon to the center of the sphere.

Figure 2:
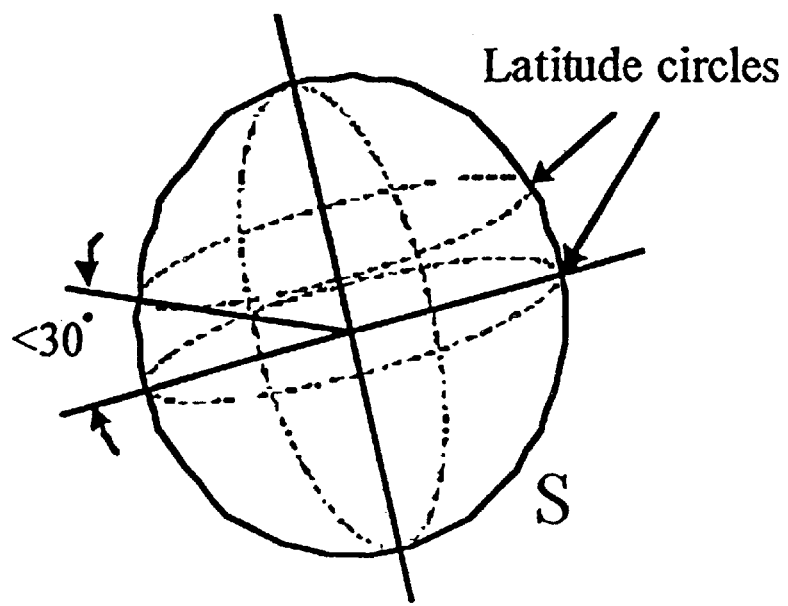
FIG. 2 is a perspective view of a potential image distribution scheme wherein an to object centered within the virtual sphere is imaged from viewpoints distributed about latitude circles spaced along the sphere (with two exemplary latitude circles being shown).

Section I.A.2 Distribution of Images About the Object: Latitude Approach (FIG. 2)

In this approach, a virtual sphere S may be defined as in Section I.A.1. Latitude circles are defined on the surface of S (i.e., circles defined by the intersection of parallel planes with the surface of sphere S), as illustrated by the exemplary arrangement in FIG. 2. Adjacent latitude circles are preferably equally spaced and not separated by more than 30 degrees. A series of viewpoints is defined about each of the latitude circles. The viewpoints are preferably equally spaced about each circle; the number of viewpoints on each latitude circle is preferably not less than 12; and latitude circles of greater diameter might contain a greater number of viewpoints than latitude circles having lesser diameter. The object is then imaged from each of these viewpoints, and the images are saved and indexed versus their viewpoint coordinates.

Section IA.3 Distribution of Images About the Object: Other Approaches

Approaches other than those previously noted in Sections I.A.1 and I.A.2 may be used to obtain images distributed about the object's volume, the only guideline being that images are preferably obtained from a relatively uniform distribution of viewpoints about the object. As will be discussed later, users may view the object from different perspectives by indexing through the object's images about the sphere; therefore, a fairly uniform distribution of images is preferred if a smooth transition from viewpoint to viewpoint is to be attained. A fluid shift from one viewpoint to another is also enhanced by increasing the number of viewpoints on the sphere. It should also be understood that if stereo (3D) viewing of the object is to be provided in lieu of 2D viewing, the object is imaged at each viewpoint not just once, but twice: a pair of images with a parallax offset (corresponding to right and left eye distance) is taken at each viewpoint.

Section I.B. Resolution of the Images

As will be discussed later (e.g., in Section II), it may be desirable to later allow users to navigate about the object and/or manipulate it in such a manner that they can obtain a close-up, "zoomed-in" view of the object, or alternatively a more distant "zoomed-out" view of the object. If the user zooms in with respect to an object, it is desirable that the images of the object have:sufficiently high resolution that they do not begin to appear "coarse" and grainy. Unfortunately, high-resolution images require greater memory and processing capacity. Additionally, a user will often view the object from such a distance that high-resolution images are unnecessary and lower-resolution images will suffice, making the high-resolution images inefficient to use. Following are preferred methods of addressing these competing concerns.

Section I.B.1 Scaling of Images

When imaging the object as described in Section I, high-resolution (and thus more memory-intensive) images are preferably taken at each viewpoint; for example, images of 2048×1536 pixels may be obtained, which each occupy about 9 MB of memory space when in uncompressed form. To transmit this data over a network (such as the Internet) will often be slow and impractical owing to limited bandwidth, and in some cases efficient transmission may be effectively impossible. However, well-known methods exist for resealing such high-resolution images to lower-resolution images, e.g., of 1024×768, 512×384, or 256×192 pixels, and these lower-resolution images require far less memory and processing capacity. As will be discussed at greater length later (e.g., in Section II.A.2), speed and capacity problems can be addressed by transmitting an appropriate lower-resolution image in place of a higher-resolution image, and then transmitting higher-resolution images (or sections or "tiles" therein) only when their use is necessary.

Section I.B.2 Tiling of Images

Tiling is a method which can be used in conjunction with the rescaling process discussed at Section I.B.1. The image—both in its high-resolution form and when it is translated to lower resolution—is divided into indexed "tiles" formed of adjacent subsections of the image. For example, a 1024×768 image might be tiled by segmenting the image on a uniform 4×4 grid to obtain 16 arrayed tiles of size 256×192. The size of each tile is such that it may be transmitted more rapidly than a high-resolution image; for example, the uncompressed size of one 256×192 tile is 9 MB/64=150 KB, and if JPEG compression is used, the size of one 256×192 tile is usually less than 15 KB. When transmitted over a 56 KB dial-in-connected modem, theoretically it takes about 0.25 second for transmission of one tile to occur. As will be discussed later (e.g., in Section II.A.2), the tiles can be used to achieve high-quality display of images during manipulation of the object and/or navigation through its space.

Section II. Display and Navigation of the Object

The user(s) may then manipulate the object and/or navigate about its virtual environment. The details of these operations may vary depending on whether a single user is performing them, or whether the operations are being simultaneously performed by multiple users in collaboration. Therefore, both the single-user and multiple-user approaches will be described in the following Sections.

Section II.A. Single-User Display and Navigation

Section II.A.1. Transmission and Display of Object
II.A.1.a First Image of Object ("Datum" Image)

When a user initially accesses the object in its virtual environment—i.e., submits a command to view the object—the server first transmits an image of the viewpoint which is chosen to be the user's first view of the object. This first or "datum" image may be arbitrarily chosen on the invisible virtual sphere S, but is preferably chosen to correspond to the frontmost central viewpoint of the object on the sphere. Additionally, the viewpoint chosen to be the first image is preferably situated at the origin of the coordinate system defined on the sphere.

Preferably, the first image is provided at the lowest resolution provided by the scaling process noted at Section I.B.1, with the object being displayed at such a zoomed-out distance that it does not appear overly grainy. However, if it is desired that a closer, zoomed-in image be displayed as the first image, a higher resolution image might first be displayed (with transmission speed decreasing as resolution increases).

II.A.1.b Neighborhood of First Image

After the first image is transmitted and displayed as described in Section II.A.1.a, the neighborhood of the—first image—i.e., the images of some number of viewpoints adjacent to the viewpoint of the first image on the sphere—is transmitted to the client/user at the same resolution as the first image. The neighborhood can be defined in any desired manner; for example, it may constitute some number N of the viewpoints which are most closely adjacent to the first image on the sphere, or some number N of viewpoints having some other predefined spatial relationship with respect to the first image (e.g., some number of N of adjacent viewpoints in some direction along the sphere's circumference). The neighborhood preferably consists of less than all of the viewpoints on the sphere, since transmission of all viewpoints could be slow and memory-intensive.

In the most preferred version of the invention, the neighborhood is defined as all viewpoints adjacent to the first image (situated at the front central location of the sphere) which rest along the horizontal equator of the sphere. By situating the neighborhood images along the sphere's equator, this means that after the user/client receives the first image and its neighborhood, the user will have a set of images which is sufficient to allow the user to view a full horizontal rotation of the object (or to view the object while making a full horizontal orbit around it).

II.A.1.c Remaining Images

In the preferred version of the invention, after the first image and its neighborhood have been transmitted, the images from all other viewpoints about the sphere are transmitted to the client/user (at the same resolution as the first image and its neighborhood) before the user can begin to manipulate the object and/or navigate its environment. Transmission of the remaining images can occur in any desired manner or order, e.g., by simply propagating outwardly from the neighborhood and transmitting images from the viewpoints encountered during this propagation. While this requires that the user must wait for all images to be transmitted prior to initiating manipulation and navigation steps, once the user receives and loads all images, manipulation and navigation is especially fast.

In alternative versions of the invention, manipulation/navigation might be allowed at any time after the user receives the first image and its neighborhood (in other words, after images have been transmitted for some, but not all, viewpoints on the sphere). In this situation, images from viewpoints outside the neighborhood might be streamed to the user during idle time, or might be transmitted to the user as needed when the user attempts to index to these viewpoints. Skipping the preloading of these more remote viewpoints will generally allow for a shorter wait (lesser loading time) before the user can begin manipulation/navigation. However, the user will initially only be able to move about the first image and its neighborhood, and will often encounter a delay in accessing images when attempting to move outside the neighborhood.

Section II.A.2. Manipulation/Navigation; Zooming

The user may then manipulate the object and/or navigate about its space using known input devices, some of which are summarized at Section III of this document. As noted in prior Sections, the first image and its neighborhood (and also preferably the remaining images about the sphere) are initially transmitted at lowest resolution (or some other "base" resolution). During initial manipulation/navigation, the user issues manipulation/navigation commands to index to different viewpoints/tiles about the virtual sphere S, thereby obtaining displays of the object from different perspectives. For example, if the imaging scheme of Section I.A.1 is used, when the user indicates that he/she wishes to rotate the view in some direction, the display may shift to the closest adjacent viewpoint or tile located on or about the specified direction. As another example, if the imaging scheme of Section I.A.2 is used, the user may index between different viewpoints on the latitude circles, and/or to the closest adjacent viewpoint or tile on adjacent latitude circles. Similarly, if the user navigates through the object's environment, the invention will simply determine the viewer's location in the virtual environment with respect to the center of the sphere, and will display the viewpoint/tile resting between the viewer's location and the sphere's center.

After a particular viewpoint or tile is transmitted and displayed, the image can be zoomed in or out. When this occurs, a zoom algorithm is used to enlarge or reduce the current viewpoint/tile (or a region therein) until some predetermined threshold level of coarseness or detail is achieved. (It is noted that various zoom algorithms are known in the art, and the selection and implementation of an appropriate algorithm is within the scope of the ordinary skills of one working in this field.) When a preset coarseness threshold of the currently-displayed viewpoint/tile is reached when zooming in, the corresponding higher-resolution viewpoint/tile is transmitted and displayed; similarly, when zooming out, when a preset detail threshold is reached, the lower-resolution viewpoint/tile is transmitted and displayed. This greatly enhances the rendering speed, and thereby enhances interactivity.

Further methods can be implemented to increase speed when manipulation and/or navigation occur when the object is viewed at other than the "base" resolution. Recall from Sections II.A.1.a–c that the images are initially loaded at some base resolution, preferably the lowest resolution, and therefore manipulation/navigation of the object is relatively fast when it is viewed at this degree of detail: the display is simply indexed from one image to the next appropriate image, which is already loaded. However, if the user is at a higher level of resolution—i.e., in a zoomed-in resolution—manipulation/navigation speed could be very slow when indexing from one high-resolution image to the next, since these images are not already loaded. Therefore, to increase speed when indexing through images in a high-resolution mode, the invention preferably displays the viewpoints currently being indexed (or tiles therein) at low resolution, and does not transmit a high-resolution image until indexing stops. To explain differently, when the user indexes from a high-resolution image, low-resolution images are displayed during indexing, and once indexing ceases, the final image will update to a high-resolution image once it completes loading. As a result, when rotating or translating the object (or the point from which the object is being viewed) starting from a high resolution display, the display will be at low resolution and will appear somewhat coarse until indexing is halted. The high-resolution image will then load, at which point the display will snap into focus. The coarseness of the intermediate viewpoints/tiles displayed between the start and finish of indexing is not very noticeable since it appears to the user to be an artifact of the indexing speed (i.e., it appears to arise because the object is moving so fast that it blurs), rather than a product of the image quality.

Section II.B. Multiple-User Display and Navigation (Collaboration)

The invention also allows multiple users at multiple locations to view and manipulate the same images at the same time, and to navigate the same environment simultaneously. By transmitting image information through the Internet or other networks, users can share their viewpoint, navigate the virtual environment, and manipulate the object in conjunction with other users. Although networking provides the infrastructure for collaboration by providing a means to share image data, due to the limited bandwidth available on many networks (e.g., the Internet), data transfer should be minimized to provide operations which occur in real-time (or nearly so).

When multiple users are to simultaneously view and navigate the virtual environment, the principles of the prior Sections are generally applicable. However, when high-resolution images (such as 1024×768 pixels or higher) are desired, it is often difficult to maintain real-time manipulation and display by transmitting images over a network. Therefore, rather than transmitting low-resolution images for standard use and then loading higher-resolution images as needed (as outlined in Section II.A), it is preferred that the images of all viewpoints, at all resolutions, are locally stored on each user's machine (e.g., on a hard drive or CD-ROM) prior to proceeding with collaboration. In general, this will allow desired images to be loaded for display much more rapidly than if they were transmitted over a network.

After all images are locally stored in each user's machine, collaboration within the networked environment may begin. No images are transmitted, and instead the other information necessary for operation is transmitted over the network, such as viewpoint information (the coordinates/indexing of the viewpoints) and manipulation/navigation commands. The viewpoint information and operation commands can be provided in the form of simple data strings, e.g., a string of integers, which are relatively small compared to the image data itself. When the client program on the local user's machine receives the image index or operation commands, the corresponding image and scene is updated. This approach minimizes the data transfer on the network and makes real-time collaboration possible.

When collaboration occurs, it is contemplated that two modes of operation will be particularly useful. In the first mode, the networked machines will accept commands from only one designated user, and therefore all users will see the display generated in accordance with the designated user's commands. In the second mode, all users view their own displays in accordance with the commands they issue, but each user may at any time access another specified user's viewpoint information and "jump to" that user's viewpoint. This can be done either temporarily (i.e., the user may be able to jump back to his/her prior viewpoint coordinates), or it may be permanent insofar as the user will afterward be "located" at the newly-accessed viewpoint and will have to navigate from that viewpoint thereafter.

Section III. Interface

Viewing objects and navigating their virtual environment may be achieved by use of traditional interface approaches, such as input via mouse clicking/dragging and output via display of images on a desktop computer screen. To provide a more intuitive and effective interface, VR (virtual reality) interface tools may be used; for example, the user may use his/her hands to manipulate the object and navigate the virtual environment by attaching a six degree-of-freedom (6DOF) motion tracker to her/his hands, or by holding a three-dimensional (3D) mouse. These allow the user to grab the object, move it, and release it using hand actions and motions. A 6DOF motion tracker could also be attached to the user's head to perform head/viewpoint tracking; when the user turns or moves his/her head, the images for the new corresponding viewpoint would be displayed. For visual feedback, a stereoscopic display may be utilized to provide the user with more realistic 3D images.

Section IV. Image Segmentation for Background Cleaning, Object Registration, and 3D Object Reconstruction Section IV.A. Image Segmentation Separation of Imaged Object From Background)

When obtaining images of the object from the distributed viewpoints as per Section, one obtains images containing both the object and its background environment. In general, a user does not care about the background environment; he/she neither wishes to manipulate it nor examine it, since the object itself is the item of interest. Additionally, since the background of the object may vary in appearance as the object is being imaged from different viewpoints, the presence of the background environment can be distracting when indexing through the images. As an example, if lighting/shadows in the background vary from one imaged viewpoint to another, the background may get lighter and darker as a user indexes through the images. It is therefore desirable, when feasible, to remove the background from the various images before the images are used for visualizing, manipulating, and navigating the object.

At present, backgrounds are often "cleaned" from digital images using semiautomatic or manual methods provided in various photoprocessing applications/suites (e.g., Adobe Photoshop, Adobe Systems, Inc., San Jose, Calif., USA). However, these methods generally: require that the background have a relatively uniform color. In an "ideal image" where the background has uniform color and the object has a different color (or colors), colors in the image may be categorized into two regions, the background region and the non-background (object) region, by comparing the RGB value of each image pixel to the RGB value of the background. Afterward, the pixels in the image which have the background pixel value can be "subtracted out" by setting their RGB values to zero, by replacing them with pixels having a uniform RGB value (preferably one significantly different from those of the object), or by replacing them with pixels which present some desired background image. However, since the background may vary in color and many factors will affect the appearance of the background and object, it is difficult to determine reference RGB values to use as points of comparison for classifying image pixels as background or object. As a result, it is difficult to directly partition the image into background and object regions. Thus, the following approach may be used.

IV.A.1 Sample the Background Region

The image can be considered to consist of a collection of pixels arranged in a two-dimensional image space, since each pixel in the image can be defined in terms of two dimensions (e.g., an X or width dimension versus a Y or height dimension). However, the image can also be considered in terms of a collection of pixels in a three-dimensional RGB space or "color space": each pixel in the image has an RGB value, and thus can be assigned a location in a three-dimensional RGB space (a space having an R dimension, a G dimension, and a B dimension). Note that whereas each pixel in the image space is associated with a single location in RGB space (since each pixel in the image has only a single RGB value), each RGB location in the RGB space may correspond to multiple pixels in the image space. As an example, an image of a uniform color field (wherein all pixels at all locations in the image space have the same RGB value) will only occupy a single pixel in RGB space.

In most common images, both the object region and background region may contain a wide variety of RGB values, and the regions may have areas with the same or similar RGB values. Thus, the system may not be able to identify and differentiate object and background regions on its own. It is therefore preferable that the user sample representative values of the background color, as by clicking on one or more areas of the image's background with a mouse. If the background contains areas of disparate RGB values, it is preferable that the user sample each of these areas. As an example, if one background region contains colors in the red region and another contains colors in the green-blue region, the user will preferably sample a number of pixels in the red region (i.e., a number of background pixels which generally represent the range of red colors in the background), and also a number of pixels in the green-blue region (i.e., a number of background pixels which generally represent the range of colors in this region).

To reduce the need for sampling numerous pixels, sampling could be at least partially automated by allowing users to automatically sample a number of pixels within some region. For example, a user can click on a pixel within a region, and the application will consider that pixel to be sampled, as well as all pixels within some radius of N pixels (e.g., 3–10 pixels) away from the clicked pixel. The mean RGB value of the pixels within the circle can then be calculated as $R_{mean}=(R_1+ \ldots +R_N)/N$, $G_{mean}=(G_1+G_2+ \ldots +G_N)/N$, and $B_{mean}=(B_1+B_2+ \ldots +B_N)/N$, with the calculated $R_{mean}$, $G_{mean}$, and $B_{mean}$ values being rounded to the closest integer value. The "mean pixel" in RGB space having the value $R_{mean}$, $G_{mean}$, and $B_{mean}$ could then be regarded as being a sampled pixel which represents the sample set (in RGB space only, as the pixel does not really have a corresponding pixel in the 2D image space).

IV.A.2 Build Clusters About the Sample Pixels

So that the background is more completely represented, it is preferred that a "clustering" method be applied to the sampled pixels in RGB space. First, some cluster threshold distance value D is defined, e.g., 5 pixels. Then, the application looks within D pixels of each sampled pixel in RGB space, and if a pixel from the image is present within this area, that second pixel is considered to be "clustered" with the sampled pixel in RGB space. The application then looks within D pixels of the second pixel in RGB space to find any other pixels from the image to add to the cluster, and so on. The cluster will stop growing once no further pixels are found within distance D of the prior pixel. Since the clustering method is applied to each of the sampled pixels in RGB space, it is possible that each pixel may develop its own cluster; that some clusters may merge when the clustering method is applied; or that all sample pixels may be included within the same cluster. To illustrate clustering by example, assume that the RGB pixels (255,255,255) and (105,100,100) are sampled points, and that they rest near pixels having RGB coordinates (250,255,255), (255,255,250), (100,100,100), (100,105,100), (105,100,100). If the cluster distance threshold value is 5, two clusters would be formed, one about the pixels (255,255,255), (250,255,255), (255,255,250), and the other about the pixels (100,100,100), (100,105,100), (105,100,100).

IV. A.3 Build a Bounding Envelope (or Envelopes) About the Sample Pixels

After clustering is performed, a bounding envelope is defined about the pixels in each cluster in RGB space. Preferably, convex hull techniques are used, though other bounding envelope techniques (such as bounding boxes) may suffice. The resulting envelopes are considered to constitute the background, whereas pixels outside the envelopes are presumed to primarily constitute the object.

IV.A.4 Expand Envelopes (Merge Adjacent Pixels into Background Envelopes)

If desired, the background envelopes may be further expanded so that they encompass regions in the background that may not have been accounted for in the prior steps. The user or application may define some expansion distance value E corresponding to a distance in RGB space. The RGB space can then be checked to see if any pixels are not included within the background envelopes, but are within the expansion distance E from the background envelopes. If they are, the background envelopes can be redefined to include these pixels. In effect, this envelope expansion step is an extension of the clustering step of Section IV.A.2: if any pixels outside an envelope are within a defined distance away from a background pixel cluster in RGB space, these pixels will be included within the cluster, and the background envelope is then redefined about the resulting cluster. However, the expansion distance value E need not be the same as the cluster threshold distance value D noted in Section IV.A.2. This is because the expansion distance value E is intended to capture "outlying" pixels in the background which are not included in the background envelope(s), but which have such similar color to a background envelope that they are probably a part of the background.

IV.A.5. Delete Aberrations Another optional step may be performed to further clean the background. For pixels outside the background envelopes noted in Section IV.A.3, a test can be performed to see whether these are leftover "spots" in the background in the 2D image—aberrations caused by noise in the digital imaging process, poor lighting, or other conditions that might cause off-color background pixels or collection of pixels. Stepping back to the 2D image space and looking at all pixels in the image which are not included in the background envelopes (i.e., all pixels in the 2D image space which do not correspond to pixels in the 3D RGB space within the background envelopes), the question is whether any pixel (or pixel cluster) is sitting spaced away from the object on the 2D image (which will presumably constitute a single area on the 2D image, though the object in RGB space may constitute numerous spaced pixels or pixel clusters). For example, there may be an aberration, e.g., a dark "smudge", sitting in the background spaced away from the object in the 2D image. However, the pixels in the smudge may not necessarily be spaced away from the object in RGB space, since the object may itself have dark areas. Therefore, a test is performed on the pixels outside the background envelopes to determine whether they exist as isolated spots in 2D image space. This can be accomplished by a variety of methods, such as by counting the number of their closely adjacent/surrounding pixels in image space (these pixels also being outside the background envelopes in RGB space). If they are under some threshold number indicating that they exist as a small spot in the 2D image, the RGB values of these pixels can be reset to some RGB value contained within the background envelopes in RGB space. In effect, this tests to see whether the size of all regions in 2D image space which are situated outside the background envelopes in 3D RGB space are greater than some predetermined size. If they are, they are considered to be within the object, and if not, they are considered to be within the background.

It is noted that the pixel clusters which are identified as being "non-object" clusters are not merged into the background envelopes by expanding the envelopes to include them. Instead, the RGB values of the pixels in the non-object clusters are reassigned to values included within the background envelopes. This effectively moves the non-object clusters within the background envelopes, rather than moving the envelopes outwardly to envelop the clusters. Moving the background envelopes in RGB space is not recommended because the envelopes could then encompass not only the non-object clusters, but also pixels/pixel clusters on the object which have RGB values similar to those of the non-object clusters.

IV.A.6. Process Background

Following the steps of Sections IV.A.1–IV.A.5 above will generally result in the image being divided into a background region and an object region within the RGB color space. The background region can then have its RGB values set to unity or some other uniform value, resulting in the background adopting a totally uniform color in the 2D image space; alternatively, some predetermined nonuniform background scene can be rendered in the pixels outside of the object. Advantageously, if the object pixels can be identified, transmission time for images can be dramatically decreased because only object region data needs to be transmitted. In this case, "generic" backgrounds can be installed about the object region when the image is rendered (e.g., the object region can be rendered over a background having some predetermined RGB value or values).

After the first image has been processed in this manner, the processing of later images can be expedited, since the images of two adjacent viewpoints on the sphere will usually have little difference in content; they contain the same background and object, albeit at different orientations. The processing of a second image at an adjacent viewpoint can utilize the RGB values of the background (or object) clusters of the first image, and/or can use the background (or object) sample data previously supplied by the user, to segment the second image into background and object clusters, and the steps of Section IV.A.1–5 onward can be used to remove the background.

Section IV.B. Object Registration/Centering

Prior to displaying images, it is also preferable to implement an object registration step to give all of the images a common (or nearly common) center of rotation. This is desirable because it is difficult to precisely center the object in the center of the sphere/volume about which the images are obtained. If the object is not centered during imaging, this can lead to artifacts when manipulating the object and/or navigating its space; for example, when rotating the object, the object may approach the viewer and then retreat owing to "eccentricity" between the object's center and the axis of rotation.

If the object is subjected to the segmentation method noted above in Section IV.A (i.e., if convex hulls or other envelopes are used to segment the object), the object will be divided into object pixel clusters of similar color in RGB space. These object clusters correspond to areas of uniform or similar color which are separated in 2D space within the image. Since the image from one viewpoint will generally have only minor differences from an image from an adjacent viewpoint, a covariance matrix can be constructed which compares position data for the object clusters of one viewpoint to the position data for object clusters in the adjacent viewpoint, and which determine the correspondence in clusters between the two. A homogenous transformation can then be applied to the images to make the matching object clusters coincide.

Section IV.C. 3D Object Reconstruction

As previously noted, the invention is able to provide significant advantages because it represents/displays an object by use of multiple 2D images rather than by a 3D model of the object. However, it may in some instances be desirable to construct a 3D model from the multiple 2D images distributed about the sphere. A 3D model should theoretically be viewable from any orientation in 3D space, whereas the use of multiple 2D images, while having the advantages noted earlier, will only allow viewing from the discrete viewpoints/orientations of the 2D images. The construction of a 3D model can be done using the following steps.

1. The silhouette of the object in the various viewpoints may be used to initially reconstruct the 3D geometry by projecting the object's silhouette from the various viewpoints, and then determining their intersection. This step can be conceptualized as placing a sphere in 3D space, and using the silhouettes of the different viewpoints to carve the sphere to approximate the shape of the object. The silhouette of the object can be defined as the boundary of the background cluster(s) (computed as in Section IV.A) and/or the object cluster(s) (computed as in Section IV.B). If the object's images are registered/centered as per Section IV.B, this can significantly enhance the accuracy of the reconstructed 3D geometry since any eccentricity in the object during initial imaging will not affect the intersection of the silhouette projections.

2. The object clusters can then be used to insert missing details on the reconstructed 3D geometry obtained from Step 1 above. Since there are silhouettes from viewpoints at widely distributed locations, the reconstructed 3D geometry will be very similar to the real object's geometry at its outside contour, but the reconstructed 3D geometry will lack any concavities that are present in the real object (since the concavities will not be reflected on a silhouette). Using a camera pin-hole model and the correspondences between matching object clusters (as determined in Section IV.B), a calculated z-value (depth) can be assigned to the matching pixels. This information can be added onto the geometry by comparing the calculated z-value to the z-value of the surface of the reconstructed 3D geometry, and adding concavities where the calculated z-value indicates greater depth than that present on the reconstructed 3D geometry.

Section IV. Other Options/Embodiments; Conclusion

To review, by replacing a 3D model of an object with 2D images of the object that are obtained about a sphere (or other volume) bounding the object, with the 2D images being indexed versus their coordinates on the sphere/volume, a more realistic-looking object can be displayed. By moving from one coordinate to another, the user may manipulate (e.g., rotate and/or translate) the object and/or navigate about its virtual environment, and view the object's appearance from different viewpoints, as if it were a 3D object in 3D space. As the user changes his/her viewpoint with respect to the object (or more accurately, its sphere), the user effectively moves the sphere with the object's images with respect to the user's viewpoint so that the displayed image of the object corresponds to the appearance of the object that would be seen if the user acted on the object in the real world in a manner analogous to the user's navigation/manipulation input. Thus, as the user rotates or translates the object-or navigates through its environment, the user's view of the object/sphere may change, and the corresponding images on the sphere are displayed to the user to reflect the change in viewpoint. This provides the user with interactive ways of viewing and examining the object.

By transmitting primarily low-resolution images which are translated from high-resolution images, interaction occurs in close to a real-time environment, even for detailed images of the object. Such translation also allows users to view images which are always at an appropriately high level of resolution when zooming in and out, i.e., the image is neither at too low of a resolution (causing a "grainy" image) or too high of a resolution (leading to greater transmission time). Stated differently, resolution can be optimized versus transmission time.

In addition, when a networked collaborative environment is established between multiple users (e.g., when the virtual environment is simultaneously viewed by multiple users over a computer network), all participants can have their own view of the object of interest, as well as share this view and navigate the virtual environment with other users.

The invention is not intended to be limited to the preferred versions described above, but rather is intended to be limited only by the claims set out below. Thus, the invention encompasses all different versions that fall literally or equivalently within the scope of these claims. Further, it is understood that in the claims, means plus function clauses (i.e., elements defined as a means for performing a function) are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. A method of displaying an electronic image of a three-dimensional object over a server-client network,
  the server containing images of the object obtained from several different viewpoints distributed about the object, each image having coordinates which correspond to its viewpoint,
  the method comprising:
    a. the client displaying the image of a first one of the viewpoints;
    b. the server obtaining a command from the client, the command indexing from the coordinates of the first viewpoint to the coordinates of an adjacent second one of the viewpoints; and
    c. the client displaying the image of the second viewpoint.

2. The method of claim 1 wherein the viewpoints are distributed at most 30 degrees apart with respect to the center of the object.

3. The method of claim 1 wherein the viewpoints include at least 12 viewpoints distributed about a plane, and being at most 30 degrees apart with respect to the center of the object.

4. The method of claim 1 wherein the viewpoints are distributed about a sphere wherein the object is located, and wherein no two adjacent viewpoints are more than 30degrees apart with respect to the object.

5. The method of claim 1 wherein all viewpoints are locally stored at the client.

6. The method of claim 1 wherein all viewpoints are initially stored at the server, and wherein the image of any selected viewpoint is transmitted to the client from the server prior to being displayed.

7. The method of claim 6 wherein the images of the first viewpoint, the second viewpoints, and at least several adjacent viewpoints are transmitted to the client prior to displaying the image of the second viewpoint.

8. The method of claim 6 wherein the first and second viewpoints rest along a path encircling the object, and wherein the images of all viewpoints resting along the path are transmitted to the client prior to displaying the image of the second viewpoint.

9. The method of claim 1 wherein:
  each viewpoint may have its image rendered at a selected one of several levels of resolution, the several levels ranging from a lowest-resolution level to a highest-resolution level, and wherein one of these several levels constitutes a default resolution level;
  b. prior to the server receiving a zoom-in command from the client, all images transmitted by the server to the client are at the default resolution level;
  c. after receiving a zoom-in command from the client for a selected viewpoint, the server transmits at least a portion of the image of the selected viewpoint to the client at a resolution level higher than the default resolution level, if one is available.

10. The method of claim 1 wherein:
  a. the image of the first viewpoint is displayed at a first resolution level;
  b. the server obtains one or more commands from the client to index from the coordinates of the first viewpoint to the coordinates of some final viewpoint, such indexing occurring between the coordinates of adjacent viewpoints, and
  c. at each newly-indexed viewpoint after the first,
    (1) the image of the viewpoint is displayed at a second resolution level lower than the first resolution level, and
    (2) the image of the viewpoint is subsequently displayed at the first resolution level until another indexing command is received.

11. The method of claim 1 wherein each image includes an object region and a background region, each region being formed of multiple points wherein each point exists in both a three-dimensional RGB space and a two-dimensional image space,
  and wherein the method includes the performance of the following steps for at least one of the images:
    a. sampling points within the background region of the image in the image space;
    b. constructing bounding envelopes about at least the sampled points in the RGB space,
    c. replacing the bounded points in image space with points having preselected RGB values.

12. A method wherein the steps of claim 12 are performed for the images of at least two adjacent viewpoints, the method including the further steps of:
  a. for each of these images, constructing bounding envelopes about points of similar color within the object region in RGB space;
  b. correlating between these images the locations in image space of the points within each image's bounding envelopes;
  c. for at least some of these images, relocating in image space at least some of the points within their object regions to increase the correlation of the locations of the boundary envelopes.

13. The method of claim 1:
  wherein the image of the first one of the viewpoints contains an object region and a background region, each region containing a number of points, each point having an RGB value;
  the method further comprising the following steps:
    a. within the two-dimensional image space of the image of the first one of the viewpoints, sampling points in the background region;
    b. within the three-dimensional RGB space of the image of the first one of the viewpoints, constructing bounding envelopes about the sampled points;
    c. within the image of the first one of the viewpoints, redefining the RGB values of the points in the bounding envelopes,
  thereby redefining the RGB values of at least a portion of the background region.

14. The method of claim 1,
  wherein the image at each viewpoint contains an object region and a background region, each region containing a number of points, the points existing in both a two-dimensional image space defined by the displayed image and in a three-dimensional RGB space defined by the RGB values of the points in the image, further comprising the following steps:
- a. for the images of at least two adjacent viewpoints, constructing bounding envelopes in RGB space about points of similar color in each image's object region,
- b. for at least one of these images, correlating the locations in image space of the points within its boundary envelopes versus the locations in image space of the points within the corresponding boundary envelopes of the other images.

15. The method of claim 14 further comprising the step of relocating in image space at least some of the points within the object regions of at least one of the images to increase the correlation of the locations of the boundary envelopes.

16. The method of claim 1, wherein the image at each viewpoint contains an object region and a background region, further comprising the steps of
- a. projecting the object regions of at least some of the viewpoints until they intersect, and
- b. reconstructing a three-dimensional model of the object from the intersections.

17. The method of claim 1 wherein all viewpoints are distributed about the object in an array in which all viewpoints are at least substantially equally spaced from their adjacent viewpoints.

18. An apparatus for displaying an electronic image of a three-dimensional object, the apparatus comprising:
- a. an electronic memory containing images of the object obtained from several different viewpoints distributed about the object, each image having coordinates which correspond to its viewpoint;
- b. an input device wherein a user may input commands indexing from the coordinates of one image to the coordinates of an adjacent image;
- c. an output device displaying the image of the viewpoint for which the user has indexed to its coordinates.

19. The apparatus of claim 18 wherein the different viewpoints are distributed about the object in an array in which all viewpoints are at least substantially equally spaced from their adjacent viewpoints.

20. A method of displaying an electronic image of a three-dimensional object comprising:
- a. imaging the object from several viewpoints distributed about the object, wherein all viewpoints are distributed about the object in an array in which all viewpoints are at least substantially equally spaced from their adjacent viewpoints;
- b. storing the image obtained at each viewpoint with respect to the coordinates of the viewpoint about the object;
- c. displaying the image of one viewpoint;
- d. obtaining a command indexing from the coordinates of the one viewpoint to the coordinates of another adjacent viewpoint; and
- e. displaying the image of the adjacent viewpoint.

* * * * *

UNITED STATES PATENT AND TRADEMARK OFFICE
CERTIFICATE OF CORRECTION

PATENT NO.    : 6,525,732 B1                                                Page 1 of 1
DATED         : February 25, 2003
INVENTOR(S)   : Gadh et al.

It is certified that error appears in the above-identified patent and that said Letters Patent is hereby corrected as shown below:

<u>Column 1,</u>
Lines 9-10, delete "[MUST BE INSERTED ONCE DETERMINED]" and insert
-- NSF Grant No.: NSF 9501760 --

Signed and Sealed this

Fifteenth Day of July, 2003

JAMES E. ROGAN
*Director of the United States Patent and Trademark Office*